United States Patent
Malmberg et al.

(10) Patent No.: US 9,727,114 B2
(45) Date of Patent: Aug. 8, 2017

(54) HW-CONTROLLED POWER DOMAINS WITH AUTOMATIC POWER-ON REQUEST

(71) Applicant: Telefonaktiebolaget L M Ericsson (publ), Stockholm (SE)

(72) Inventors: Magnus Malmberg, Södra Sandby (SE); Alberth Arvidsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 111 days.

(21) Appl. No.: 14/496,553

(22) Filed: Sep. 25, 2014

(65) Prior Publication Data

US 2016/0091944 A1    Mar. 31, 2016

(51) Int. Cl.
| | | |
|---|---|---|
| *G06F 1/00* | (2006.01) | |
| *G06F 1/32* | (2006.01) | |
| *G06F 1/26* | (2006.01) | |
| *G06F 21/81* | (2013.01) | |
| *H04L 12/10* | (2006.01) | |
| *G06F 17/50* | (2006.01) | |

(52) U.S. Cl.
CPC .......... *G06F 1/3203* (2013.01); *G06F 1/3287* (2013.01); *G06F 1/26* (2013.01); *G06F 17/5045* (2013.01); *G06F 21/81* (2013.01); *G06F 2212/1024* (2013.01); *H04L 12/10* (2013.01); *Y02B 60/1282* (2013.01); *Y02B 60/32* (2013.01)

(58) Field of Classification Search
CPC ................... G06F 1/26; G06F 17/5045; G06F 2212/1024; G06F 21/81; H04L 12/10
See application file for complete search history.

(56) References Cited

U.S. PATENT DOCUMENTS

| | | |
|---|---|---|
| 7,443,759 B1 | 10/2008 | Rowlands et al. |
| 2006/0282686 A1 | 12/2006 | Bahali et al. |
| 2008/0025123 A1 | 1/2008 | Rajan et al. |
| 2008/0307240 A1* | 12/2008 | Dahan ................ G06F 1/06 713/320 |
| 2009/0135751 A1 | 5/2009 | Hodges et al. |

(Continued)

FOREIGN PATENT DOCUMENTS

WO    2008017625 A2    2/2008

OTHER PUBLICATIONS

Sakurai, T. et al., "Power Gating: Circuits, Design Methodologies, and Best Practice for Standard-Cell VLSI Designs," ACM Transactions on Design Automation of Electronic Systems (TODAES), vol. 15, No. 4, Article 28, Sep. 2010, ACM, 37 pages.

(Continued)

*Primary Examiner* — Xuxing Chen
(74) *Attorney, Agent, or Firm* — Withrow & Terranova, PLLC

(57) ABSTRACT

Systems and methods related to hardware controlled power domains in a hardware system (e.g., an integrated circuit) are disclosed. In one embodiment, fully automatic power on and power off of the power domains in the hardware system is provided without software involvement. In this manner, power up and power down times for the power domains are substantially reduced or minimized, which in turn enables shorter active times for the power domains and thus reduced power consumption (e.g., reduced leakage when hardware in the power domains is idle).

22 Claims, 14 Drawing Sheets

(56) References Cited

U.S. PATENT DOCUMENTS

| | | | |
|---|---|---|---|
| 2011/0138204 A1* | 6/2011 | Fischer | H04W 52/0212 |
| | | | 713/320 |
| 2011/0252245 A1 | 10/2011 | Lai | |
| 2011/0302438 A1* | 12/2011 | Rosay | G06F 1/3203 |
| | | | 713/323 |
| 2012/0185706 A1* | 7/2012 | Sistla | G06F 1/3206 |
| | | | 713/300 |
| 2013/0073878 A1 | 3/2013 | Jayasimha et al. | |
| 2013/0086398 A1 | 4/2013 | Khor et al. | |

OTHER PUBLICATIONS

International Search Report for International Patent Application No. PCT/EP2015/070964, mailed Oct. 23, 2015, 3 pages.

\* cited by examiner

HW-CONTROLLED POWER DOMAINS WITH AUTOMATIC POWER-ON REQUEST

TECHNICAL FIELD

The present disclosure relates to control of power domains within an integrated circuit and more specifically relates to hardware controlled power up and power down of power domains within an integrated circuit.

BACKGROUND

The power consumption in an Application Specific Integrated Circuity (ASIC) and other similar integrated circuits comes mainly from two sources, namely, dynamic power and static power (i.e., leakage). The dynamic power consumed by the ASIC is the power consumed by the ASIC due to circuit switching to perform the desired task(s). In other words, dynamic power consumption is the power consumption due to active circuitry within the ASIC during operation. In contrast, the static power consumption of the ASIC is power consumption due to current(s) that constantly flow through the ASIC as long as the ASIC is powered and is not related to the actual task(s) that are performed by the ASIC. In other words, the static power consumption is the power consumption of the circuitry within the ASIC when inactive.

The trend is that leakage becomes a larger part of the power consumption of the ASIC as the technology used to fabricate the ASIC goes down, or reduces, in geometry. As a result, it is becoming more and more important to manage leakage for power consumption sensitive ASICs such as, for example, ASICs found in mobile devices (e.g., mobile phones).

Currently, there are several techniques that are used to reduce leakage. The most common of these techniques is power gating of power domains. More specifically, power domains are time controlled by software. The software de-activates, or powers down, a power domain when the software knows that no hardware block within the power domain needs power based on a defined use case(s). The software activates, or powers on, a power domain when, based on the currently running use case, the software knows that a hardware block(s) within the power domain needs power. The activation time for a power domain includes the time required by the software to make the decision to activate the power domain, the time needed for state changes handled via interrupt, and the time needed to control the power switches for the power domain. Further, a large safety margin must be added such that the power domain is activated before the hardware block(s) are accessed. In other words, the power domain must be powered a relatively long period of time before the hardware block(s) in the power domain are to be accessed. As a result, the power domains are activated, or powered, longer than needed.

For example, FIG. 1 illustrates a Hardware (HW) system 10 including five HW blocks 12-1 through 12-5 (generally referred to collectively as HW blocks 12 and individually as HW block 12) as well as a ring bus 14 including a separate Ring Bus Interface (RBI) 16-1 through 16-5 (generally referred to collectively as RBIs 16 and individually as RBI 16) for each of the HW blocks 12-1 through 12-5. The HW blocks 12-1 through 12-5 are connected to the corresponding RBIs 16-1 through 16-5 via corresponding Input Output Sockets (IOSs) 18-1 through 18-5 (generally referred to collectively as IOSs 18 and individually as IOSs 18). FIG. 1 also illustrates an example of the active times of the HW blocks 12. If each HW block 12 is implemented in a separate power domain that is activated or de-activated via software in the conventional manner, the software needs to have good control of when the HW blocks 12 are active as well as handle the power up and power down time of the corresponding power domains. With the overhead for power up of the power domains and controlling the activation time via interrupt or other mechanism, the most likely solution is that all of the HW blocks 12 are powered on all the time.

Thus, there is a need for an improved system for controlling power consumption, and in particular leakage, in an integrated circuit.

U.S. Pat. No. 7,443,759 entitled "Reduced-Power Memory with Per-Sector Ground Control" discloses selective power control of sectors comprised in a reduced-power memory. The selective power control selects a sector of the memory to power-up in response to a subset of address bits for accessing the memory and individually powers up the selected sector by decreasing ground potential for the selected sector from a retention level to an access level.

U.S. Patent Application Publication No. 2008/0025123 entitled "Interface Circuit System and Method for Autonomously Performing Power Management Operations in Conjunction with a Plurality of Memory Circuits" discloses an interface circuit that is in communication with memory circuits and a system. The interface circuit autonomously performs a power management operation in association with at least a portion of the memory circuits. In particular, a memory circuit in a non-accessed state is identified. A power saving operation, such as power down, is initiated for the identified memory circuit.

International Patent Application Publication No. WO 2008/017625 entitled "Distributed Autonomous Power Management in a Memory System" discloses a control unit that autonomously manages power within and for a group of memory devices.

These references relate to reduction of power consumption in a memory system and do not relate to powering up and powering down of hardware power domains.

SUMMARY

Systems and methods related to hardware controlled power domains in a hardware system (e.g., an integrated circuit) are disclosed. In one embodiment, fully automatic power on and power off of the power domains in the hardware system is provided without software involvement. In this manner, power up and power down times for the power domains are substantially reduced or minimized, which in turn enables shorter active times for the power domains and thus reduced power consumption (e.g., reduced leakage when hardware in the power domains is idle).

In some embodiments, a hardware system comprises a hardware block comprising one or more hardware components, a hardware power controller, and a hardware interface. The hardware power controller is configured to control one or more power domains of the hardware system. The power domains of the hardware system comprise a power domain of the hardware block. The hardware interface is configured to receive at least one message for the hardware block and store the at least one message. In response to receiving the at least one message for the hardware block, the hardware interface is configured to activate a power request from the hardware interface to the hardware power controller to thereby request that power to the hardware block be activated. Once the power domain of the hardware block is powered up, the hardware interface receives an indication from the hardware block that the hardware block is ready to accept messages. In response, the hardware interface provides the at least one message to the hardware block. In this manner, a fully automatic power up procedure for the power domain of the hardware block is provided.

In some embodiments, the hardware power controller is configured to power up the power domain of the hardware block in response to activation of the power request from the hardware interface. Further, in some embodiments, the hardware block is configured to, in response to the power domain of the hardware block being powered up, activate a power request from the hardware block to the hardware power controller to thereby request that power to the hardware block be maintained until the power request from the hardware block is de-activated.

In some embodiments, the hardware interface is further configured to de-activate the power request from the hardware interface to the hardware power controller upon determining that there are no more messages received by the hardware interface for the hardware block that are to be provided to the hardware block. Further, in some embodiments, the hardware block is further configured to de-activate the power request from the hardware block to the hardware power controller upon determining that there are no more messages received from the hardware interface to be processed by the hardware block, and the hardware power controller is further configured to power down the power domain of the hardware block in response to de-activation of the power request from the hardware interface and de-activation of the power request from the hardware block.

Further, in some embodiments, the hardware power controller is further configured to indicate, to the hardware block, that the power domain of the hardware block is being powered down to thereby indicate to the hardware block that the hardware block is not to accept messages from the hardware interface.

In some embodiments, in response to activation of the power request from the hardware interface, the hardware power controller is configured to power up the power domain of the hardware block, wait for power to the power domain of the hardware block to be stable, and, when the power within the power domain of the hardware block is stable, then activate the hardware block. In some embodiments, in order to activate the hardware block, the hardware power controller is configured to de-activate one or more isolation cells that operate to isolate the power domain when power to the power domain is de-activated, de-activate a reset of the hardware block, and activate a system on request for the hardware block to thereby inform the hardware block that power to the hardware block is activated.

In some embodiments, the hardware block is configured to, in response to being activated, activate a power request from the hardware block to the hardware power controller to thereby request that the hardware power controller maintain power to the hardware block until the power request from the hardware block is de-activated, activate a message accept from the hardware block to the hardware interface to thereby indicate that the hardware block is ready to accept messages from the hardware interface, and activate a system acknowledgement from the hardware block to the hardware power controller.

Further, in some embodiments, the hardware interface is further configured to de-activate the power request from the hardware interface to the hardware power controller when there are no more messages received by the hardware interface for the hardware block that are to be provided to the hardware block, and the hardware block is further configured to de-activate the power request from the hardware block to the hardware power controller when there are no more messages received by the hardware block from the hardware interface that are to be processed by the hardware block. The hardware power controller is further configured to power down the power domain of the hardware block in response to de-activation of the power request from the hardware interface and de-activation of the power request from the hardware block.

In some embodiments, in order to power down the power domain of the hardware block, the hardware power controller is further configured to inform the hardware block that power to the hardware block is being de-activated. In response to being informed that the power to the hardware block is being de-activated, the hardware block is further configured to de-activate the message accept from the hardware block to the hardware interface to thereby indicate that the hardware block is no longer accepting messages from the hardware interface.

In some embodiments, after de-activating the message accept from the hardware block to the hardware interface, the hardware block is further configured to determine whether any messages were received from the hardware interface while de-activating the message accept from the hardware block to the hardware interface. If no messages were received from the hardware interface while de-activating the message accept from the hardware block to the hardware interface, the hardware block is configured to continue with power down of the power domain of the hardware block. If one or more messages were received from the hardware interface while deactivating the message accept from the hardware block to the hardware interface, the hardware block is configured to terminate power down of the power domain of the hardware block.

In some embodiments, in order to continue power down, the hardware block is further configured to de-activate the system acknowledgement from the hardware block to the hardware power controller. In response to the de-activation of the system acknowledgement, the hardware power controller is further configured to de-activate the power to the power domain.

In some embodiments, in order to terminate power down, the hardware block is further configured to activate the power request from the hardware block to the hardware power controller, de-activate the system acknowledgement from the hardware block to the hardware power controller, and activate the message accept from the hardware block to the hardware interface. In response to de-activation of the system acknowledgement, the hardware power controller is further configured to inform the hardware block that power to the hardware block is being activated. In response to being informed that power to the hardware block is being activated, the hardware block is further configured to activate the system acknowledgement from the hardware block to the hardware power controller.

In some embodiments, the power domain comprises the hardware block and at least one additional hardware block, and the hardware system further comprises circuitry configured to combine the power request from the hardware interface for the hardware block and at least one additional power request from the hardware interface for the at least one additional hardware block in the power domain to provide a combined power request from the hardware interface to the hardware power controller. The combined power request from the hardware interface is activated when any one or more of the power request and the at least one additional power request from the hardware interface are activated and de-activated when both the power request and the at least one additional power request from the hardware interface are de-activated. The hardware power controller is configured to power up the power domain in response to activation of the combined power request from the hardware interface.

In some embodiments, after power to the power domain is activated, the hardware block is further configured to provide a power request from the hardware block to thereby request that power to the hardware block be maintained until the power request from the hardware block is de-activated. Likewise, the at least one additional hardware block is configured to provide at least one additional power request from the at least one additional hardware block to thereby request that power to the at least one additional hardware block be maintained until the at least one additional power request from the at least one additional hardware block is de-activated. The hardware system further comprises circuitry configured to combine the power request from the hardware block and the at least one additional power request from the at least one additional hardware block to provide a combined power request from the power domain. The combined power request from the power domain is activated when any one or more of the power request from the hardware block and the at least one additional power request from the at least one additional hardware block are activated and de-activated when both the power request from the hardware block and the at least one additional power request from the at least one additional hardware block are de-activated. The hardware controller is further configured to power down the power domain in response to de-activation of the combined power request from the hardware interface and de-activation of the combined power request from the power domain.

In some embodiments, the power domain comprises the hardware block and at least one additional hardware block, and the hardware power controller is configured to power up the power domain in response to activation of any one or more of the power request from the hardware interface for the hardware block and at least one additional power request from the hardware interface for the at least one additional hardware block in the power domain.

In some embodiments, after the power to the power domain is activated, the hardware block is further configured to provide a power request from the hardware block to thereby request that power to the hardware block be maintained until the power request from the hardware block is de-activated. Likewise, the at least one additional hardware block is configured to provide at least one additional power request to thereby request that power to the at least one additional hardware block be maintained until the at least one additional power request from the at least one additional hardware block is de-activated. The hardware power controller is further configured to power down the power domain in response to de-activation of both the power request and the at least one additional power request from the hardware interface and de-activation of both the power request from the hardware block and the at least one additional power request from the at least one additional hardware block.

In some embodiments, the hardware interface is a ring bus comprising a ring bus interface for each hardware block of a plurality of hardware blocks including the hardware block.

In some embodiments, the hardware power controller is further configured to power down the power domain of the hardware block in response to a power down request from external software.

In some embodiments, the hardware interface is further configured to request a clock for the power domain in response to receiving the at least one message for the hardware block.

In some embodiments, a method of providing power control in a hardware system is provided. The hardware system comprises a hardware block comprising one or more hardware components, a hardware power controller configured to control one or more power domains of the hardware system including a power domain of the hardware block, and a hardware interface. In this embodiment, the method comprises receiving, by the hardware interface, at least one message for a hardware block comprising one or more hardware components and storing, by the hardware interface, the at least one message. In addition, the method comprises activating, by the hardware interface, in response to receiving the at least one message for the hardware block, a power request from the hardware interface to a hardware power controller, receiving, by the hardware interface, an indication from the hardware block that the hardware block is ready to accept messages from the hardware interface, and providing, by the hardware interface, the at least one message to the hardware block in response to receiving the indication from the hardware block that the hardware block is ready to accept messages from the hardware interface.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
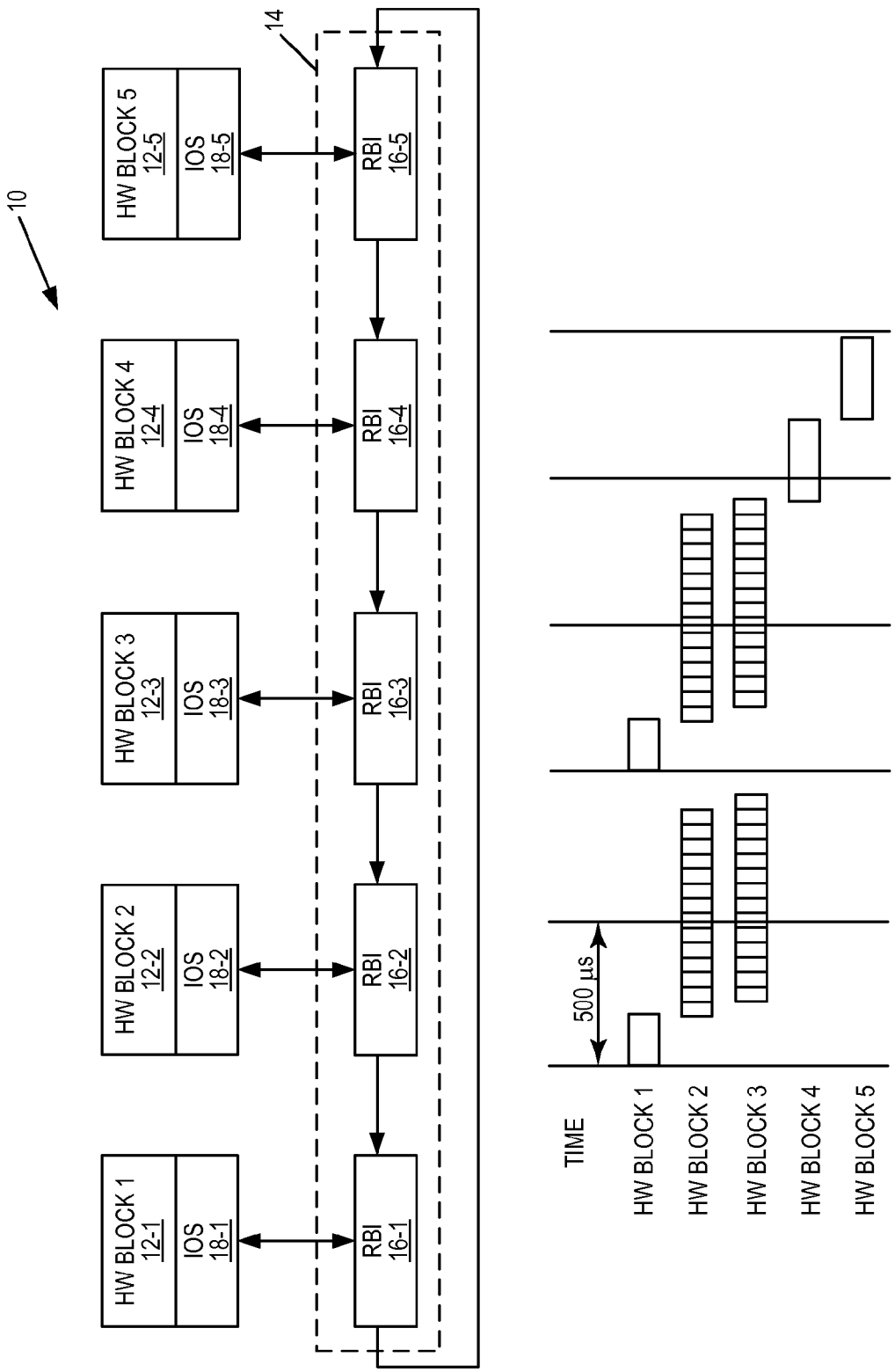
FIG. 1 illustrates an example of a hardware system and active times of hardware blocks in the hardware system.
Figure 2:
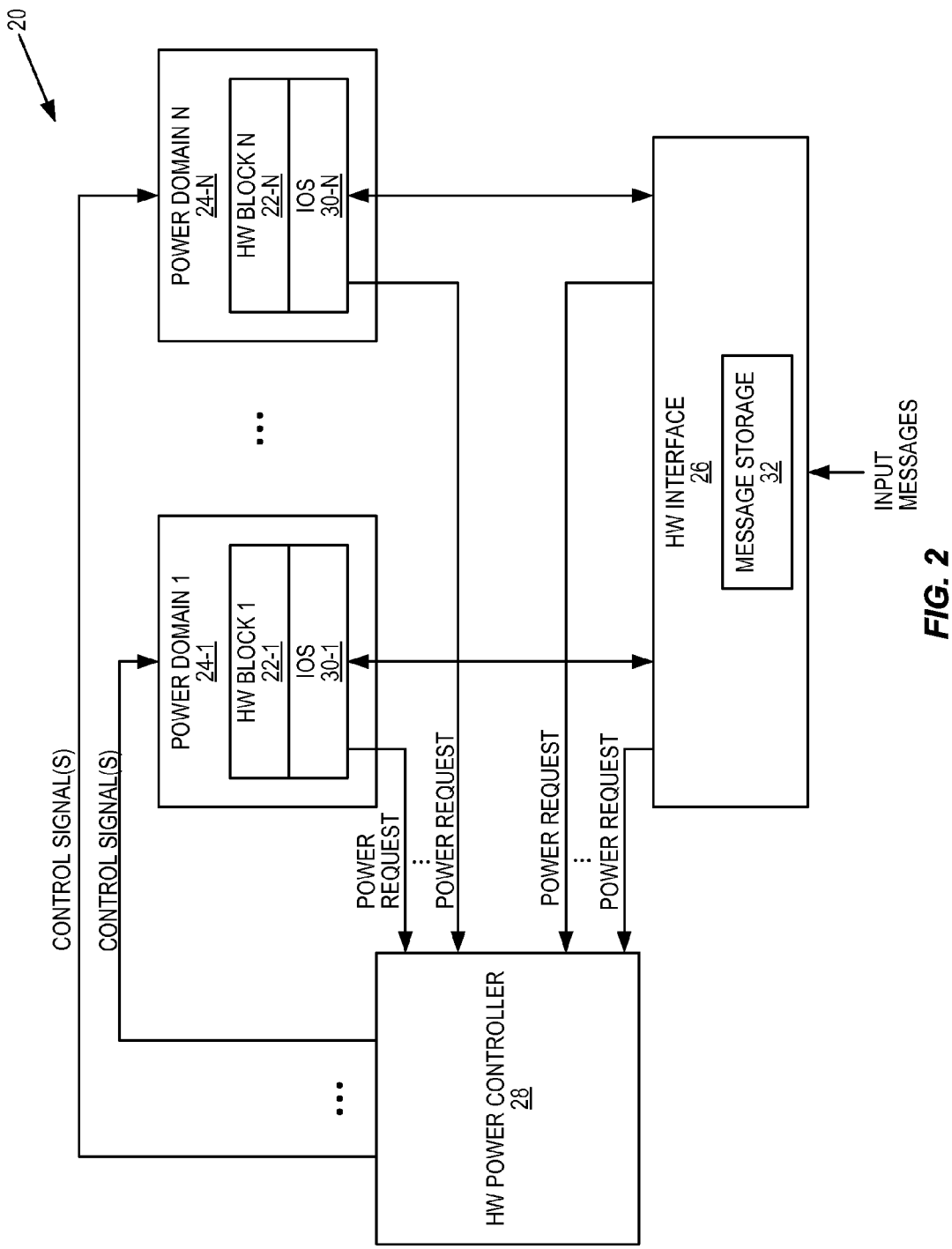
FIG. 2 illustrates a hardware system that provides fully automatic flow for power up and power down of power domains without software involvement according to one embodiment of the present disclosure.

Systems and methods are disclosed that provide fully automatic flow for power up and power down of power domains without software involvement. In this regard, FIG. 2 illustrates a Hardware (HW) system 20 that provides fully automatic flow for power up and power down of power domains without software involvement according to one embodiment of the present disclosure. Note that while software is not required, software may be utilized as an additional trigger for power up or power down of the power domains. As illustrated, the HW system 20 includes HW blocks 22-1 through 22-N (generally referred to collectively as HW blocks 22 and individually as HW block 22) implemented in corresponding power domains 24-1 through 24-N (generally referred to collectively as power domains 24 and individually as power domain 24). Notably, the HW blocks 22 are blocks of hardware components that operate to process messages received via a HW interface 26. The HW blocks 22 process the messages and do not retain either the messages or results of the processing of the messages in the HW blocks 22 themselves and, as such, may be powered down when inactive or idle. In this example, each HW block 22 is implemented in a separate power domain 24. In other words, each power domain 24 includes a single HW block 22. However, the HW system 20 is not limited thereto. For example, as discussed below, a power domain 24 may include multiple HW blocks 22.

The HW system 20 also includes the HW interface 26 and a HW power controller 28. The HW blocks 22-1 through 22-N are communicatively coupled to the HW interface 26 via corresponding Input Output Sockets (IOSs) 30-1 through 30-N (generally referred to collectively as IOSs 30 and individually as IOS 30). As discussed below, in one embodiment, the HW interface 26 is a ring bus; however, the HW interface 26 is not limited to a ring bus and may be implemented as any suitable type of interface. The HW power controller 28 includes, in one embodiment, dedicated hardware for controlling each of the power domains 24. Importantly, the HW system 20 and, in particular, the HW blocks 22, the HW interface 26, the HW power controller 28, and the IOSs 30 are all implemented in hardware and operate to provide fully automatic flow for power up and power down of the power domains 24 without software involvement. In one particular embodiment, the HW system 20 is implemented as or as part of an Application Specific Integrated Circuit (ASIC) or similar integrated circuit.

In general, the HW interface 26 receives messages for the HW blocks 22. In other words, the HW interface 26 receives messages from another hardware and/or software system that may be implemented on the same integrated circuit or external to the integrated circuit in which the HW system 20 is implemented. For example, if the HW interface 26 is a ring bus, the messages are input to the ring bus from some other hardware and/or software system. However, the HW interface 26 is implemented in hardware and, thus, the reception of the messages by the HW interface 26 is a hardware function. Upon receiving a message for a particular HW block 22, the HW interface 26 stores the messages in message storage 32 and activates a power request to the HW power controller 28 for that HW block 22. The HW interface 26 maintains the power request for the HW block 22 until there are no more messages for the HW interface 26 to deliver to the HW block 22. In response to the activation of the power request from the HW interface 26 for the HW block 22, the HW power controller 28 then powers on the power domain 24 of that HW block 22 using one or more control signals. When the power domain 24, and thus the HW block 22, is powered on, the HW block 22 activates a power request to the HW power controller 28. The HW block 22 maintains the power request until the HW block 22 no longer needs power. Once both the power request from the HW interface 26 for the HW block 22 and the power request from the HW block 22 have been de-activated, the HW power controller 28 powers down the power domain 24 of the HW block 22. For power down, the HW power controller 28 communicates with the HW block 22 to prevent new messages from being received by the HW block 22 within the power domain 24 while the power is brought down and when the power in the power domain 24 is off. In this manner, power up and power down of the power domains 24 is fully automatic. Further, since power up and power down are controlled by hardware without software involvement, the amount of time needed for power up and power down is minimized, which in turn reduces the active time of the HW block 22 and thus the power consumption of the HW block 22. Also, by reducing the power up and power down times, the power domains 24 can be powered up and powered down on demand as needed, which in turn enables reduced leakage.

Figure 3:
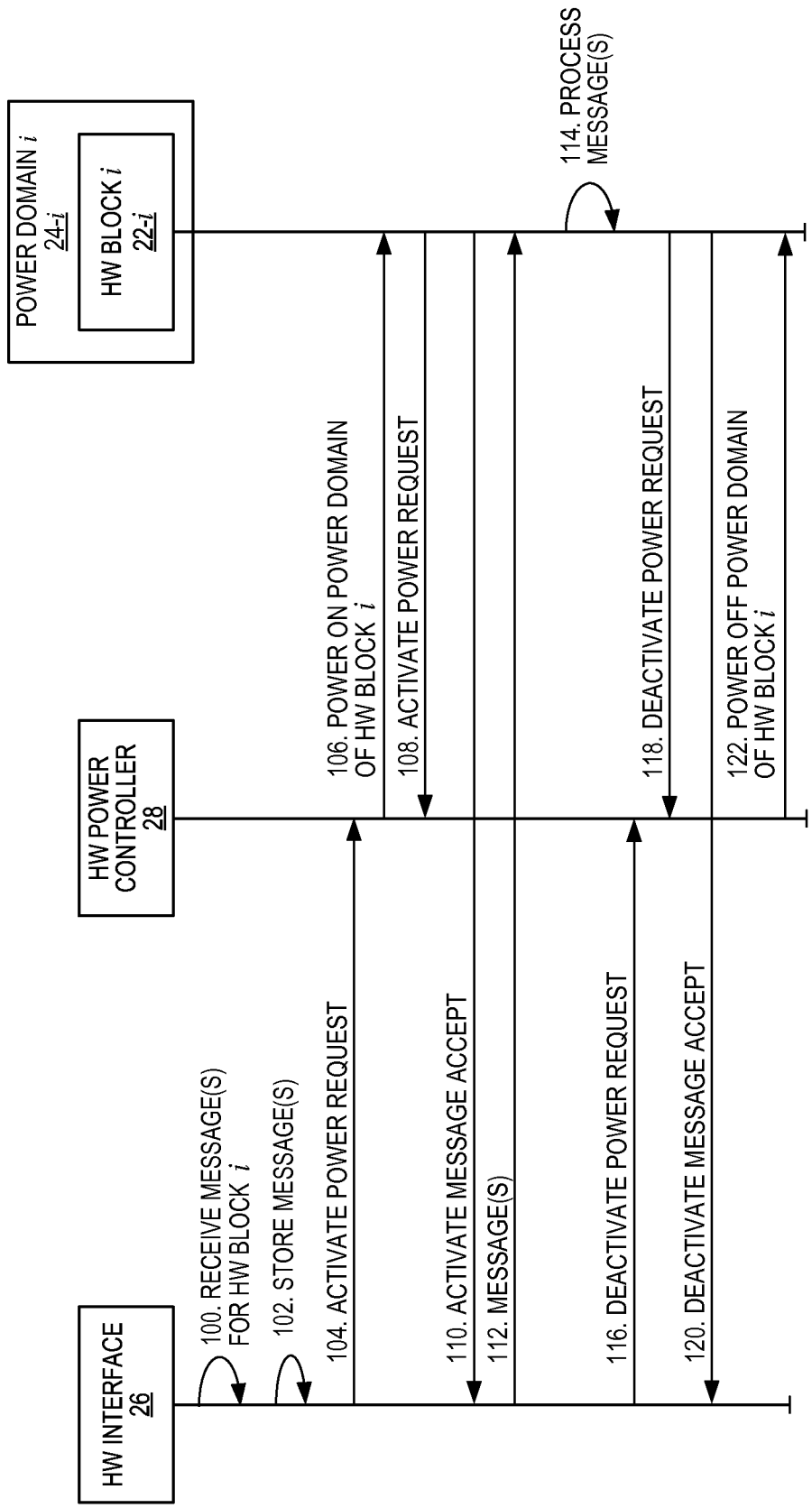
FIG. 3 illustrates the operation of the hardware system of FIG. 2 according to one embodiment of the present disclosure.

FIG. 3 illustrates the operation of the HW system 20 of FIG. 2 according to one embodiment of the present disclosure. The operation is illustrated with respect to the i-th HW block 22-$i$ (i.e., $1 \leq i \leq N$) in the i-th power domain 24-$i$. However, it should be appreciated that this discussion is equally applicable to the other HW blocks 22. As illustrated, the HW interface 26 receives one or more messages for the HW block 22-$i$ (step 100). The message(s) is(are) received from some system, component, or device that is, for example, implemented within the same integrated circuit (e.g., within the same ASIC) or external to the integrated circuit (e.g., external to the ASIC).

In this example, the HW interface 26 stores the message(s) within the message storage 32 of the HW interface 26 (step 102). For example, in some embodiments, the HW interface 26 is a ring bus, and the message(s) are stored within the ring bus by sending the messages through the ring bus from a ring bus interface for one of the HW blocks 22 to a ring bus interface for the next HW block 22 and so on. However, storage of the message(s) is not limited thereto. Any suitable storage mechanism (e.g., memory) can be used. The message(s) may alternatively be stored external to the HW interface 26. In response to receiving the message(s), the HW interface 26 activates a power request to the HW power controller 28 for the HW block 22-$i$ (step 104). In some embodiments, the power request is activated by activating a corresponding signal (e.g., asserting a signal to a logic "1"). In response to the activation of the power request for the HW block 22-$i$, the HW power controller 28 powers up, or powers on, the power domain 24-$i$ of the HW block 22-$i$ (step 106).

In some embodiments, when the power domain 24-$i$, and thus the HW block 22-$i$, is powered on, the HW block 22-$i$ activates a power request to the HW power controller 28 (step 108). The HW block 22-$i$ maintains the power request to the HW power controller 28 until the HW block 22-$i$ no longer needs power (e.g., until the HW block 22-$i$ has completed processing of all messages from the HW interface 26 and no new messages from the HW interface 26 have been received). Note, however, that this is only one way for the HW block 22-$i$ to indicate to the HW interface 26 when the HW block 22-$i$ no longer needs power. For example, in other embodiments, the HW block 22-$i$ may not activate a power request in step 108 and, instead, activate a power down request when the HW block 22-$i$ no longer needs power. In order to begin receiving messages from the HW interface 26, the HW block 22-$i$ activates a message accept indicator to the HW interface 26 (step 110). In response to the activated message accept indicator from the HW block 22-$i$, the HW interface 26 sends the message(s) to the HW block 22-$i$ (step 112).

The HW block 22-$i$ then processes the message(s) (step 114). The sending of the message(s) from the HW interface 26 to the HW block 22-$i$ and the processing of the message(s) by the HW block 22-$i$ continues until the HW interface 26 has no further messages to send to the HW block 22-$i$ and the HW block 22-$i$ has completed processing of all of the messages. When the HW interface 26 has no more messages to send to the HW block 22-$i$, the HW interface 26 de-activates the power request to the HW power controller 28 for the HW block 22-$i$ (step 116). Similarly, when the HW block 22-$i$ has completed processing of the messages received from the HW interface 26, the HW block 22-$i$ de-activates the power request to the HW power controller 28 for the HW block 22-$i$ (step 118). In response to the de-activation of the power request for the HW block 22-$i$ from the HW interface 26 and the de-activation of the power request from the HW block 22-$i$, the HW power controller 28 powers down, or powers off, the power domain 24-$i$ of the HW block 22-$i$ (step 122).

Figure 4:
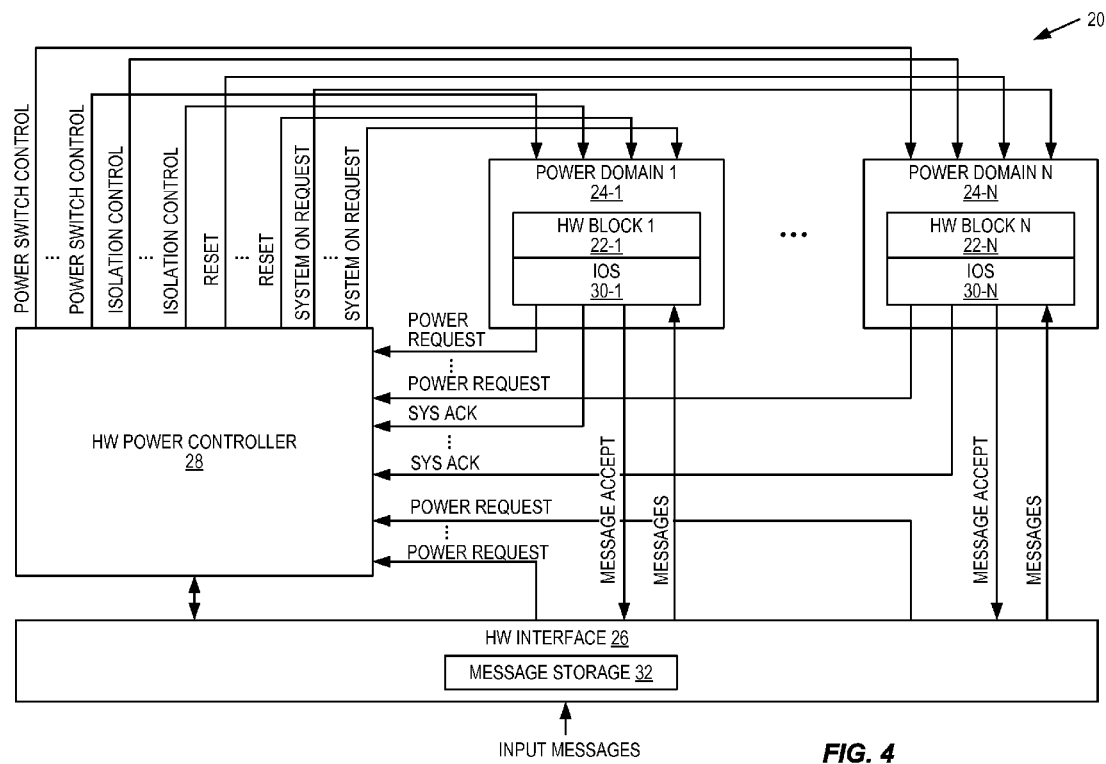
FIG. 4 illustrates a hardware system that provides fully automatic flow for power up and power down of power domains without software involvement according to another embodiment of the present disclosure.
Figure 5:
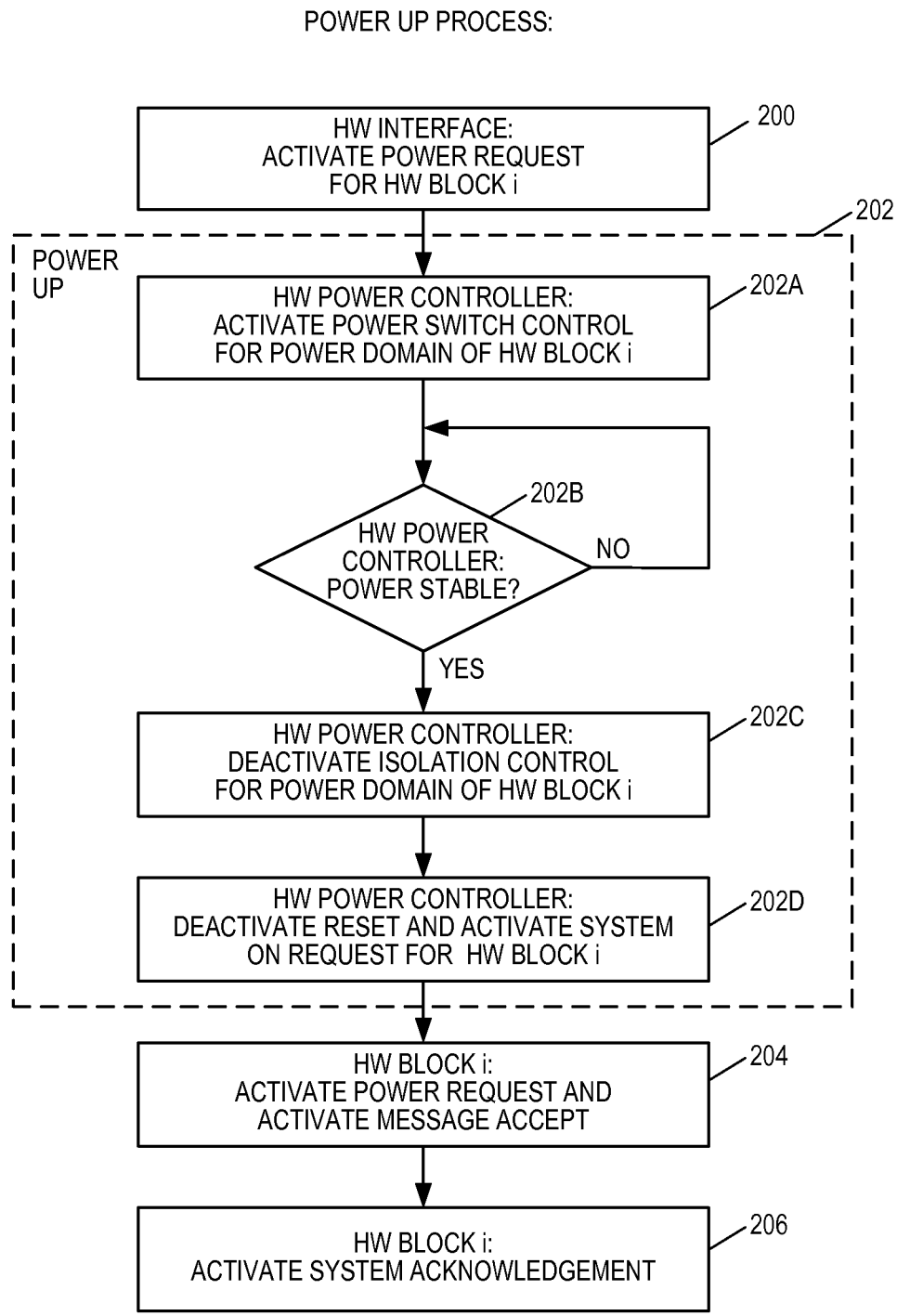
FIG. 5 illustrates a power up procedure performed by the hardware system of FIG. 4 to power up a power domain according to one embodiment of the present disclosure.

FIGS. 4, 5, 6A, and 6B illustrate the HW system 20 as well as power up and power down of the HW system 20 according to another embodiment of the present disclosure. As illustrated in FIG. 4, the HW system 20 is substantially the same as that illustrated in FIG. 2. As illustrated in FIG. 5, a power up procedure for the i-th HW block 22-$i$ begins when the HW interface 26 receives and stores one or more messages for the HW block 22-$i$, as described above with respect to steps 100 and 102 of FIG. 3. In response to receiving the message(s) for the HW block 22-$i$, the HW interface 26 activates a power request to the HW power controller 28 for the HW block 22-$i$ (step 200). This step corresponds to step 104 of FIG. 3. In response, the HW power controller 28 powers up the power domain 24-$i$ of the HW block 22-$i$ (step 202). Step 202 corresponds to step 106 of FIG. 3.

More specifically, in this embodiment, the HW power controller 28 powers up the power domain 24-$i$ of the HW block 22-$i$ by activating power switch control for the power domain 24-$i$ of the HW block 22-$i$ (step 202A). While not illustrated, the power domain 24-$i$ is powered via one or more power switches. Activating the power switch control for the power domain 24-$i$ closes those power switches such that power is applied to the power domain 24-$i$. After activating the power switch control, the HW power controller 28 waits until power to the power domain 24-$i$ is stable (step 202B). In one embodiment, the HW power controller 28 waits a predefined amount of time after which the power to the power domain 24-$i$ is known to be stable. Once power to the power domain 24-$i$ is stable, the HW power controller 28 de-activates isolation control for the power domain 24-$i$ of the HW block 22-$i$ (step 202C). While not illustrated, the power domain 24-$i$ may in one embodiment include one or more isolation cells or isolation circuitry that isolates the HW block 22-$i$ when the power domain 24-$i$ is powered down in order to, e.g., prevent leakage of power from the other power domains 24 into the HW block 22-$i$. De-activating the isolation control removes the isolation of the HW block 22-$i$ (i.e., de-activates the isolation cell(s) or isolation circuitry). The HW power controller 28 also de-activates a reset for the HW block 22-$i$ and activates a system on request for the HW block 22-$i$ (step 202D).

At this point, the power domain 24-$i$ and thus the HW block 22-$i$ in the power domain 24-$i$ are powered on. Once powered on, the HW block 22-$i$ activates a power request to the HW power controller 28 and activates a message accept indicator to the HW interface 26 (step 204). In addition, in some embodiments, the HW block 22-$i$ activates a system acknowledgement to the HW power controller 28 (step 206). From this point, operation proceeds as discussed above. The HW block 22-$i$ receives and processes the message(s) from the HW interface 26. The HW block 22-$i$ remains powered on until the HW interface 26 has no more messages to deliver to the HW block 22-$i$ and the HW block 22-$i$ has completed processing of all of the messages received from the HW interface 26.

Figure 6A:
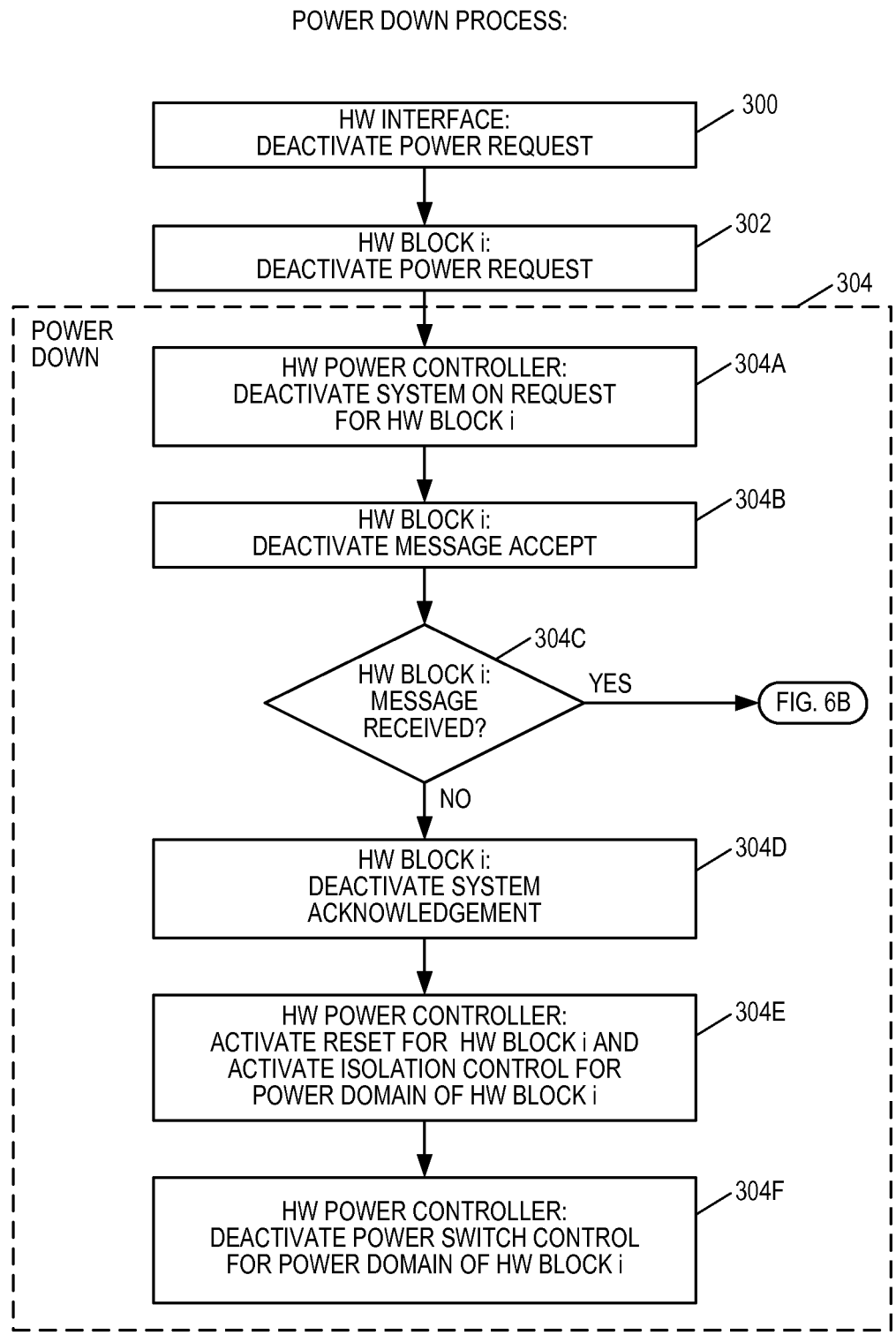
FIGS. 6A and 6B illustrate a power down procedure performed by the hardware system of FIG. 4 to power down a power domain according to one embodiment of the present disclosure.
Figure 6B:
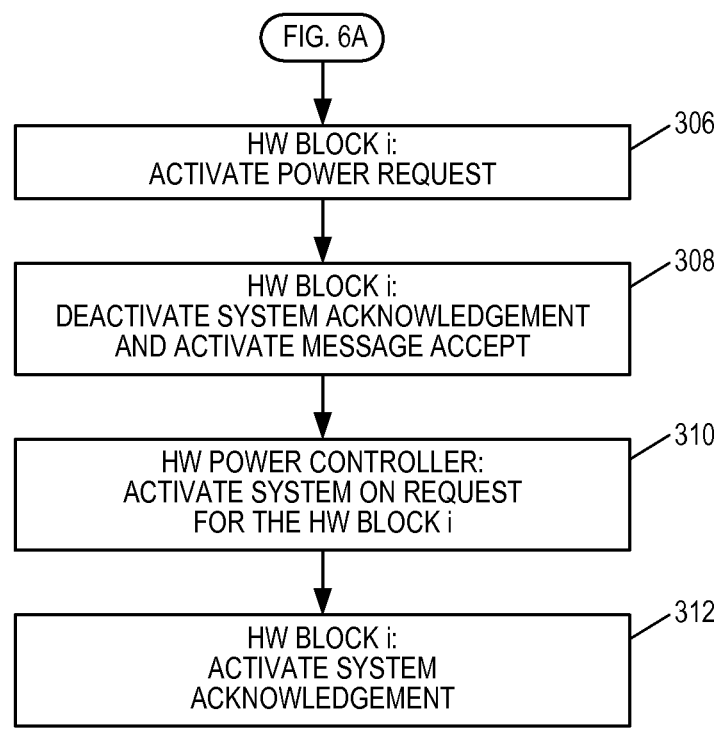

As illustrated in FIGS. 6A and 6B, a power down procedure for the i-th HW block 22-$i$ begins when the HW interface 26 de-activates the power request to the HW power controller 28 for the HW block 22-$i$ and the HW block 22-$i$ de-activates the power request to the HW power controller 28 (steps 300 and 302). Steps 300 and 302 correspond to steps 116 and 118 of FIG. 3. In response, the HW power controller 28 powers down the power domain 24-$i$ of the HW block 22-$i$ (step 304). Step 304 corresponds to step 122 of FIG. 3. More specifically, the HW power controller 28 de-activates the system on request for the HW block 22-$i$ (step 304A). In response, the HW block 22-$i$ de-activates the message accept indicator to the HW interface 26 (step 304B). In this manner, the HW block 22-$i$ informs the HW interface 26 that the HW block 22-$i$ is no longer able to accept messages from the HW interface 26.

In this embodiment, the HW block 22-$i$ determines whether a message was received from the HW interface 26 while de-activating the message accept indicator (step 304C). If not, the HW block 22-$i$ de-activates the system acknowledgement to the HW power controller 28 (step 304D). In response, the HW power controller 28 activates the reset for the HW block 22-$i$ and activates the isolation control for the power domain 24-*i* of the HW block 22-*i* (step 304E). In addition, the HW power controller 28 de-activates the power switch control for the power domain 24-*i* of the HW block 22-*i* (step 304F). At this point, power down is complete.

Returning to step 304C, if a message was received from the HW interface 26 while de-activating the message accept indicator, power down is terminated. More specifically, in this embodiment, the HW block 22-*i* activates the power request to the HW power controller 28 (step 306). In addition, the HW block 22-*i* de-activates the system acknowledgement to the HW power controller 28 and activates the message accept indicator to the HW interface 26 (step 308). In response, the HW power controller 28 activates the system on request for the HW block 22-*i* (step 310). In response, the HW block 22-*i* activates the system acknowledgement to the HW power controller 28 (step 312).

It should be noted that FIG. 5 and FIGS. 6A and 6B illustrate embodiments of the power up and power down procedures, respectively. However, not all of the actions illustrated in FIG. 5 and FIGS. 6A and 6B may be included in all implementations. For example, in some implementations the system acknowledgement from the HW block 22-*i* to the HW power controller 28 may not be included. As another example, with respect to the power down procedure of FIGS. 6A and 6B, steps 304C and 306-312 may not be included in some embodiments.

Figure 7:
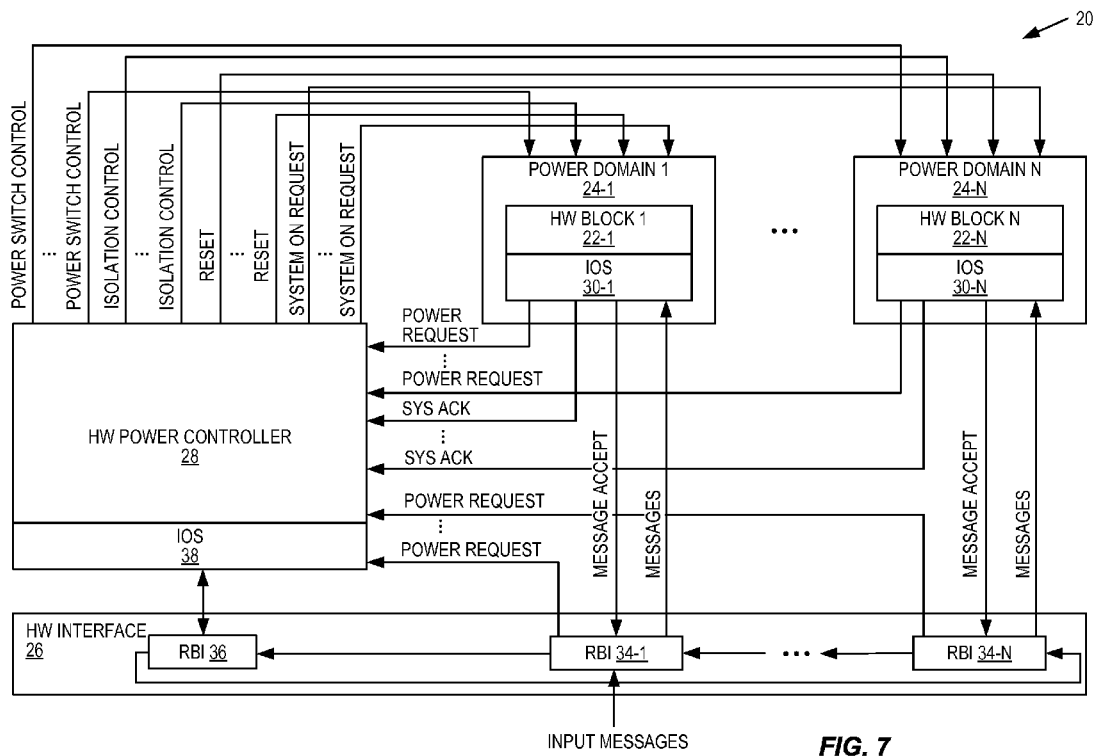
FIG. 7 illustrates a hardware system that provides fully automatic flow for power up and power down of power domains without software involvement according to another embodiment of the present disclosure.

FIG. 7 illustrates the HW system 20 according to another embodiment in which the HW interface 26 is a ring bus. As illustrated, the HW interface 26 includes Ring Bus Interfaces (RBIs) 34-1 through 34-N (generally referred to collectively as RBIs 34 and individually as RBI 34), each responsible for delivering messages to a corresponding one of the HW blocks 22. In this example, the HW interface 26 also includes an RBI 36 for delivering messages to the HW power controller 28. The HW power controller 28 is communicatively coupled to the RBI 36 via an IOS 38. The HW system 20 operates in the same manner as described above with respect to the HW system 20 of FIG. 4.

Figure 8:
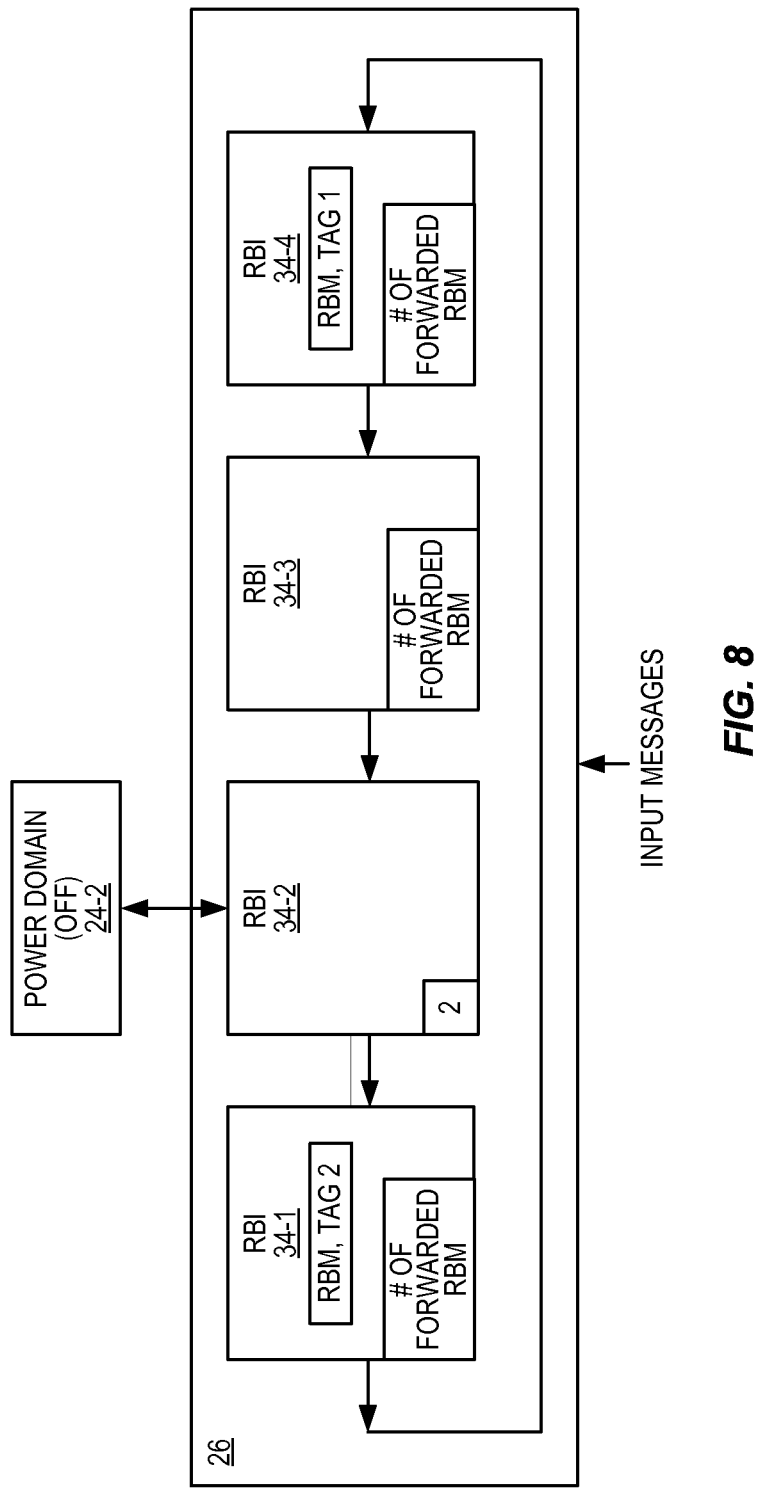
FIG. 8 illustrates the operation of the ring bus of FIG. 7 to provide message storage according to one embodiment of the present disclosure.

As discussed above, the HW interface 26 includes the message storage 32 for storing messages until the HW blocks 22 are powered up and ready to accept messages. While the messages can be stored in any suitable manner (e.g., within memory inside or associated with the HW interface 26), FIG. 8 illustrates the operation of the ring bus of FIG. 7 to provide message storage according to one embodiment of the present disclosure. In this embodiment, the message storage 32 feature is implemented within the ring bus. As illustrated, each RBI 34 stores a number indicative of the number of messages (referred to as Ring Bus Messages (RBMs)) that have been received by the ring bus for the corresponding HW block 22. In this example, the power domain 24-2 is powered down (i.e., off). While the power domain 24-2 is powered down, the ring bus receives two messages for the HW block 22-2 in the power domain 24-2. As such, the RBI 34-2 stores the number "2" to indicate that two messages have been received and are stored on the ring bus for the HW block 22-2. The messages are stored by the ring bus by continuing to propagate the messages around the ring bus. In addition, in this example, the messages are output in a First-In-First-Out (FIFO) manner. More specifically, in this example, the messages are tagged to indicate the order in which the messages were received by the ring bus. Using these tags, the messages can be delivered to the HW block 22-2 in the same order in which the messages were received by the ring bus once the HW block 22-2 is powered on and ready to accept messages.

Figure 9:
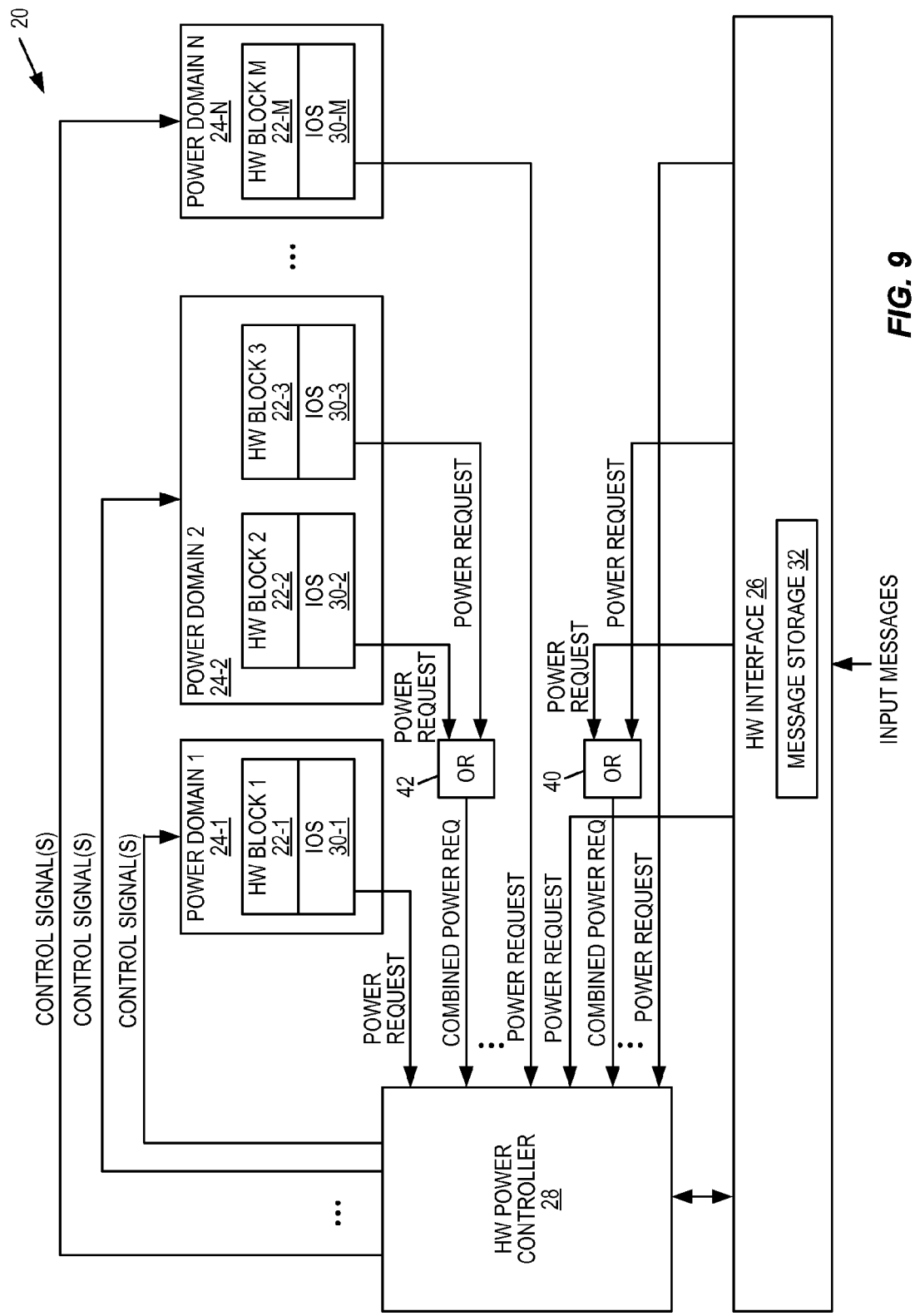
FIG. 9 illustrates a hardware system that provides fully automatic flow for power up and power down of power domains without software involvement according to another embodiment of the present disclosure.

In the embodiments described above, the power domains 24 each include a single HW block 22. However, the HW system 20 is not limited thereto. In this regard, FIG. 9 illustrates the HW system 20 according to an embodiment in which at least one of the power domains 24 includes multiple HW blocks 22. Specifically, the HW system 20 includes power domains 24-1 through 24-N and HW blocks 22-1 through 22-M, where M>N. In this example, the power domain 24-2 includes HW blocks 22-2 and 22-3. While not illustrated, other power domains 24 may include one, two, or more HW blocks 22. Using the power domain 24-2 as an example, the HW interface 26 provides separate power requests for the HW blocks 22-2 and 22-3. Thus, when the HW interface 26 receives a message(s) for the HW block 22-2, the HW interface 26 activates the power request for the HW block 22-2. Likewise, when the HW interface 26 receives a message(s) for the HW block 22-3, the HW interface 26 activates the power request for the HW block 22-3.

In this embodiment, the HW system 20 includes a logical OR gate 40 that combines the power requests from the HW interface 26 for the HW blocks 22-2 and 23-3 in the power domain 24-2 to provide a combined power request for the power domain 24-2. Thus, if either or both of the power requests from the HW interface 26 for the HW blocks 22-2 and 22-3 is activated, then the combined power request for the power domain 24-2 is activated. In response to activation of the combined power request for the power domain 24-2, the HW power controller 28 powers on the HW blocks 22-2 and 22-3 in the power domain 24-2 as described above. For example, in one embodiment, the HW power controller 28 activates the power switch control (i.e., closes the power switches) for the power domain 24-2, de-activates the isolation cells or isolation circuitry for the power domain 24-2, de-activates the reset signals for the HW blocks 22-2 and 22-3, and activates a system on request for the HW blocks 22-2 and 22-3.

Once powered on, the HW blocks 22-2 and 22-3, activate power requests to the HW power controller 28 and activate the message accept indicators to the HW interface 26 (not shown in FIG. 9). In this embodiment, the power requests from the HW blocks 22-2 and 22-3 in the power domain 24-2 are logically OR'd by an OR gate 42 to provide a combined power request from the HW blocks 22-2 and 22-3 in the power domain 24-2. The HW power controller 28 maintains power to the power domain 24-2 until both the combined power request from the HW blocks 22-2 and 22-3 in the power domain 24-2 is de-activated (i.e., the power requests from both of the HW blocks 22-2 and 22-3 in the power domain 24-2 are de-activated) and the combined power request from the HW interface 26 for the power domain 24-2 is de-activated. At that point, the HW power controller 28 powers down the power domain 24-2 in the manner described above. For example, the HW power controller 28 de-activates the system on request for the HW blocks 22-2 and 22-3 in the power domain 24-2. In response, the HW blocks 22-2 and 22-3 de-activate their message accept indicators to the HW interface 26. If no messages are received by the HW blocks 22-2 and 22-3 while de-activating their message accept indicators, the HW blocks 22-2 and 22-3 then de-activate their system acknowledgements (which may be combined to provide a combined system acknowledgment for the power domain 24-2). In response, the HW power controller 28 activates a reset signal for the HW blocks 22-2 and 22-3 in the power domain 24-2 and activates the isolation cell(s) or isolation circuitry for the power domain 24-2. The HW power controller 28 also de-activates the power switch control for the power domain 24-2. Using the architecture of FIG. 9, the HW power controller 28 does not need to have knowledge regarding the number of HW blocks 22 in each power domain 24. Rather, by generating the combined power requests, the HW blocks 22-2 and 22-3 in the power domain 24-2 are seen by the HW power controller 28 as a single combined HW block 22 in the power domain 24-2.

Figure 10:
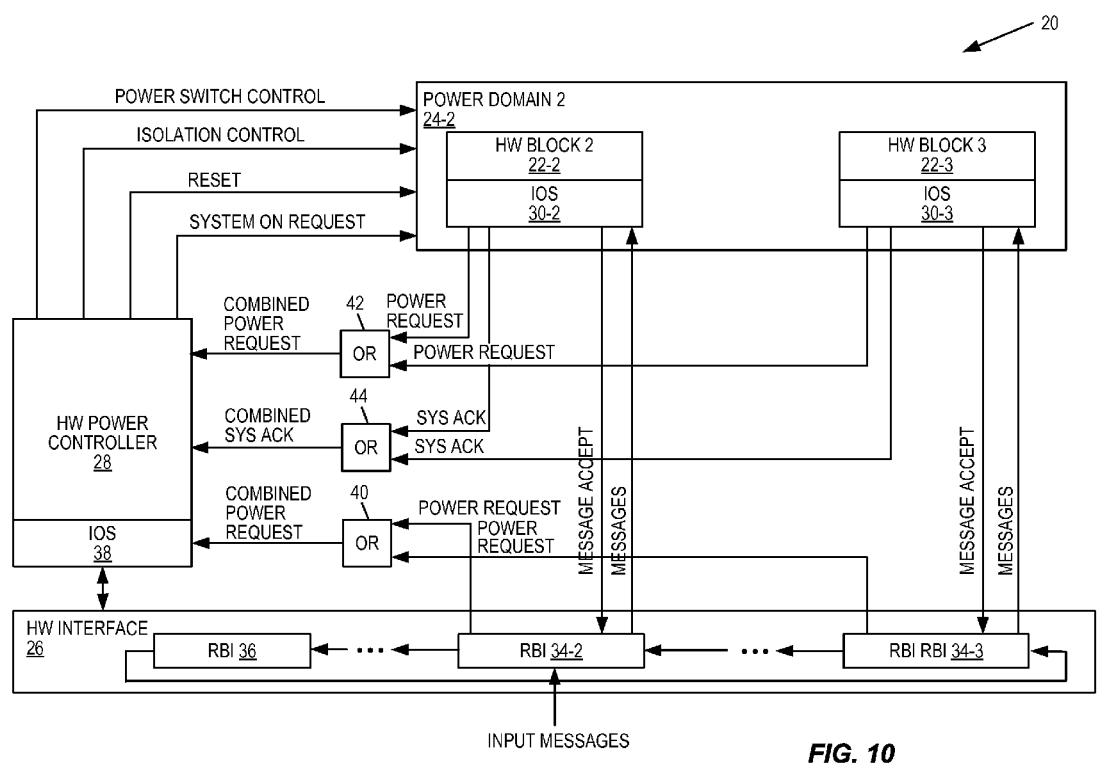
FIG. 10 illustrates the hardware system of FIG. 9 wherein the hardware interface is implemented as a ring bus according to one embodiment of the present disclosure.

FIG. 10 illustrates an embodiment of the HW system 20 of FIG. 9 in which the HW interface 26 is a ring bus as described above. Note that for clarity, only the power domain 24-2 is illustrated in FIG. 10. Further, FIG. 10 also illustrates a logical OR gate 44 that combines the system acknowledgments of the HW blocks 22-2 and 22-3 in the power domain 24-2 to provide a combined system acknowledgment to the HW power controller 28 for the power domain 24-2. Otherwise, the HW system 20 operates as described above with respect to FIG. 9.

Figure 11:
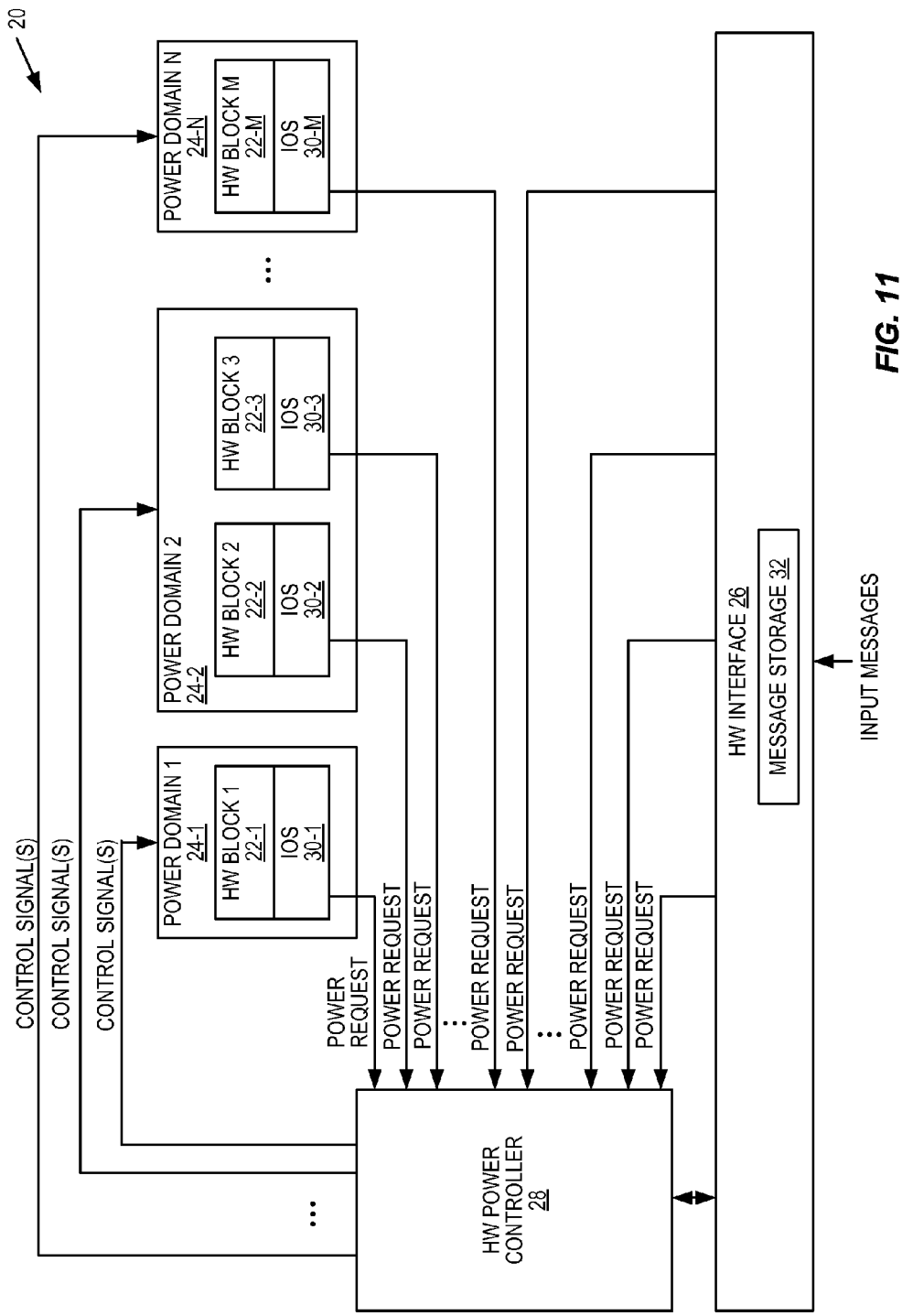
FIG. 11 illustrates a hardware system that provides fully automatic flow for power up and power down of power domains without software involvement according to another embodiment of the present disclosure.

FIG. 11 illustrates an embodiment similar to that of FIG. 9 but where separate power requests for the HW blocks 22-2 and 22-3 in the power domain 24-2 are provided to the HW power controller 28. The logical OR'ing of the power requests is performed within the HW power controller 28. Specifically, the HW power controller 28 operates to power up the power domain 24-2 when the power request from the HW interface 26 for the HW block 22-2 and/or the power request from the HW interface 26 for the HW block 22-3 is activated. Conversely, the HW power controller 28 operates to power down the power domain 24-2 when the power requests from the HW blocks 22-2 and 22-3 in the power domain 24-2 are both de-activated and the power requests from the HW interface 26 for the HW blocks 22-2 and 22-3 in the power domain 24-2 are both de-activated. Otherwise, the operation of the HW system 20 is as described above.

Figure 12:
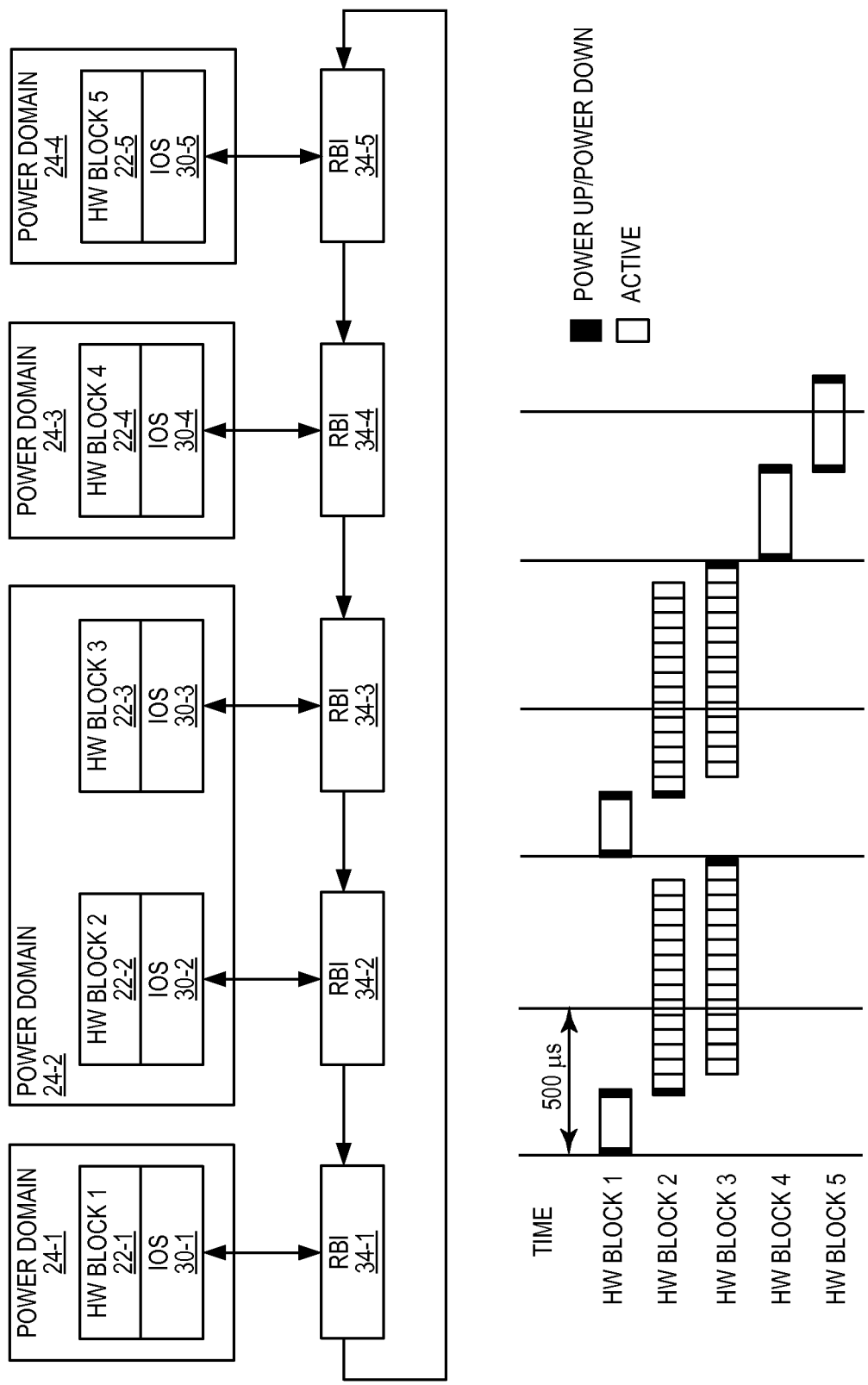
FIG. 12 illustrates example power up, power down, and active times for one example of a hardware system providing fully automatic flow for power up and power down of power domains without software involvement according to another embodiment of the present disclosure.

FIG. 12 illustrates example power up, power down, and active times for one example of the HW system 20. In this example, the HW system 20 includes five HW blocks 22 and four power domains 24, where two HW blocks 22-2 and 22-3 are included in the power domain 24-2. As illustrated, the HW blocks 22 have short power up and power down times (e.g., a few microseconds).

Figure 13:
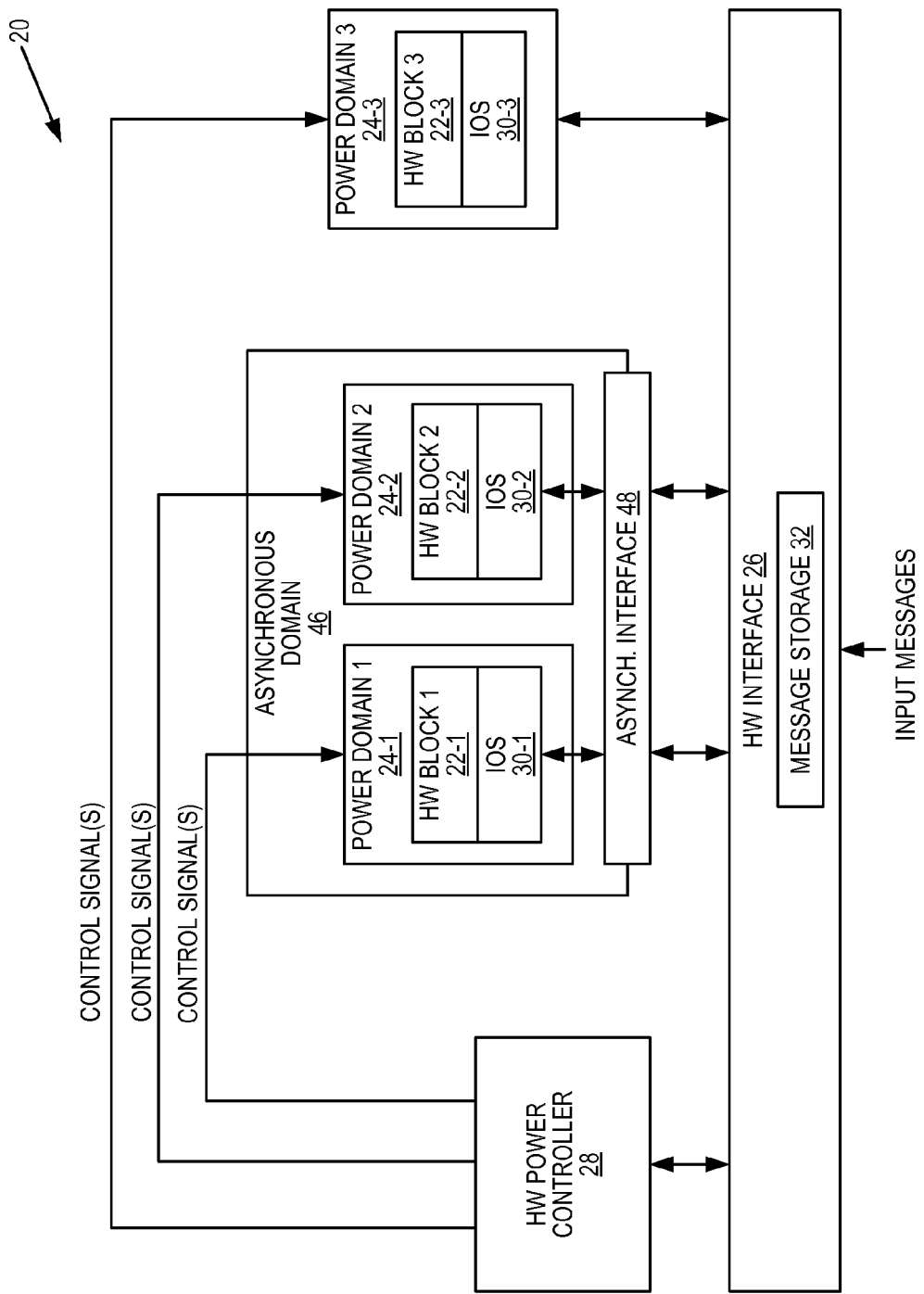
FIG. 13 illustrates a hardware system that provides fully automatic flow for power up and power down of power domains without software involvement according to another embodiment of the present disclosure.

FIG. 13 illustrates the HW system 20 according to another embodiment of the present disclosure. This embodiment is to illustrate that the HW system 20 of any of the embodiments described above may, in some embodiments, include an asynchronous domain 46. In this example, the power domains 24-1 and 24-2 are implemented in the asynchronous domain 46. An asynchronous interface 48 enables communication between the HW interface 26 and the asynchronous domain 46. Otherwise, the HW system 20 operates as described with respect to any of the embodiments of the HW system 20 described herein.

The systems and methods disclosed herein provide numerous benefits and advantages over the conventional software controlled power domains. While not being limited to or by any particular benefit or advantage, some examples are as follows. Leakage can be reduced by using the power requests from the HW interface 26 and the HW blocks 22 to trigger power up and power down of the corresponding power domains 24, as well as moving the control of the power up and power down of the power domains 24 to dedicated hardware (i.e., the HW power controller 28) with a set of control signals, state machines, and internal communication with the HW blocks 22.

As another example, by enabling the power domains 24 to be active, or powered on, only when needed as well as minimizing the time for powering up and powering down the power domains 24, power consumption is reduced both when the HW blocks 22 in the power domains 24 are idle, or inactive, and when the HW blocks 22 in the power domains 24 are operating, or active (e.g., by minimizing the power up and power down time and thus the amount of time that the power domains 24 are active).

As another example, using the HW controlled power domains 24 enables the power for a power domain 24 to only be switched on when needed without overhead introduced by software control. HW control of the power domains 24 also enables high granularity of the power domains 24 with domains on HW block level or groups of HW blocks level.

As yet another example, while the systems and methods described above provide a fully automatic flow for powering up and powering down the power domains 24 without software involvement, software may, in some implementations, be used in addition to the systems and methods described above as another mechanism to trigger power up or power down. For example, software may be used to force power up or power down of a power domain 24.

In addition, it should be noted that the systems and methods described herein may be used together with other leakage reduction techniques to further reduce leakage. For example, in one embodiment, the power request from the HW interface 26 to the HW power controller 28 for a HW block 22 in a power domain 24 may additionally be used to trigger a clock request by which a clock to the HW block 22 is activated. The clock may be activated by the HW power controller 28 by, for example, activating an enable signal for the clock for the power domain 24 or specifically for the clock for the HW block 22.

The following acronyms are used throughout this disclosure.

ASIC Application Specific Integrated Circuit
FIFO First-In-First-Out
HW Hardware
IOS Input Output Socket
RBI Ring Bus Interface
RBM Ring Bus Message Those skilled in the art will recognize improvements and modifications to the embodiments of the present disclosure. All such improvements and modifications are considered within the scope of the concepts disclosed herein and the claims that follow.

What is claimed is:

1. A hardware system comprising:
a hardware block comprising one or more hardware components;
a hardware power controller configured to control one or more power domains of the hardware system, the one or more power domains comprising a power domain of the hardware block; and
a hardware interface configured to:
receive at least one message for the hardware block;
store the at least one message;
in response to receiving the at least one message for the hardware block, activate a power request from the hardware interface to the hardware power controller to thereby request that the power domain of the hardware block be powered up, wherein the hardware power controller is configured to power up the power domain of the hardware block in response to activation of the power request from the hardware interface and the hardware block is configured to, in response to the power domain of the hardware block being powered up, activate a power request from the hardware block to the hardware power controller to thereby request that power to the hardware block be maintained until the power request from the hardware block is de-activated;
receive an indication from the hardware block that the hardware block is ready to accept messages from the hardware interface; and
provide the at least one message to the hardware block in response to receiving the indication from the hardware block that the hardware block is ready to accept messages from the hardware interface.

2. The hardware system of claim 1 wherein the hardware interface is further configured to de-activate the power request from the hardware interface to the hardware power controller upon determining that there are no more messages received by the hardware interface for the hardware block that are to be provided to the hardware block.

3. The hardware system of claim 1 wherein:
the hardware block is further configured to de-activate the power request from the hardware block to the hardware power controller upon determining that there are no more messages received from the hardware interface to be processed by the hardware block; and
the hardware power controller is further configured to power down the power domain of the hardware block in response to de-activation of the power request from the hardware interface and de-activation of the power request from the hardware block.

4. The hardware system of claim 3 wherein the hardware power controller is further configured to indicate, to the hardware block, that the power domain of the hardware block is being powered down to thereby indicate to the hardware block that the hardware block is not to accept messages from the hardware interface.

5. The hardware system of claim 1 wherein, in response to activation of the power request from the hardware interface, the hardware power controller is further configured to:
wait for power to the power domain of the hardware block to be stable; and
when the power to the power domain of the hardware block is stable, then activate the hardware block.

6. The hardware system of claim 5 wherein, in order to activate the hardware block, the hardware power controller is configured to:
de-activate one or more isolation cells that operate to isolate the power domain when power to the power domain is de-activated;
de-activate a reset of the hardware block; and
activate a system on request for the hardware block to thereby inform the hardware block that power to the hardware block is activated.

7. The hardware system of claim 5 wherein, in response to being activated, the hardware block is further configured to:
activate a message accept from the hardware block to the hardware interface to thereby indicate that the hardware block is ready to accept messages from the hardware interface; and
activate a system acknowledgement from the hardware block to the hardware power controller.

8. The hardware system of claim 7 wherein:
the hardware interface is further configured to de-activate the power request from the hardware interface to the hardware power controller when there are no more messages received by the hardware interface for the hardware block that are to be provided to the hardware block;
the hardware block is further configured to de-activate the power request from the hardware block to the hardware power controller when there are no more messages received by the hardware block from the hardware interface that are to be processed by the hardware block; and
the hardware power controller is further configured to power down the power domain of the hardware block in response to de-activation of the power request from the hardware interface and de-activation of the power request from the hardware block.

9. The hardware system of claim 8 wherein:
in order to power down the power domain of the hardware block, the hardware power controller is further configured to inform the hardware block that power to the hardware block is being de-activated; and
in response to being informed that the power to the hardware block is being de-activated, the hardware block is further configured to de-activate the message accept from the hardware block to the hardware interface to thereby indicate that the hardware block is no longer accepting messages from the hardware interface.

10. The hardware system of claim 9 wherein:
after de-activating the message accept from the hardware block to the hardware interface, the hardware block is further configured to determine whether any messages were received from the hardware interface while de-activating the message accept from the hardware block to the hardware interface; and
if no messages were received from the hardware interface while de-activating the message accept from the hardware block to the hardware interface, the hardware block is configured to continue with power down of the power domain of the hardware block; and
if one or more messages were received from the hardware interface while deactivating the message accept from the hardware block to the hardware interface, the hardware block is configured to terminate power down of the power domain of the hardware block.

11. The hardware system of claim 10 wherein:
in order to continue power down, the hardware block is further configured to de-activate the system acknowledgement from the hardware block to the hardware power controller; and
in response to the de-activation of the system acknowledgement, the hardware power controller is further configured to de-activate the power to the power domain.

12. The hardware system of claim 10 wherein:
in order to terminate power down, the hardware block is further configured to activate the power request from the hardware block to the hardware power controller, de-activate the system acknowledgement from the hardware block to the hardware power controller, and activate the message accept from the hardware block to the hardware interface;
in response to de-activation of the system acknowledgement, the hardware power controller is further configured to inform the hardware block that power to the hardware block is being activated; and
in response to being informed that power to the hardware block is being activated, the hardware block is further configured to activate the system acknowledgement from the hardware block to the hardware power controller.

13. The hardware system of claim 1 wherein the power domain comprises the hardware block and at least one additional hardware block, and the hardware system further comprises:
   circuitry configured to combine the power request from the hardware interface for the hardware block and at least one additional power request from the hardware interface for the at least one additional hardware block in the power domain to provide a combined power request from the hardware interface to the hardware power controller that is activated when any one or more of the power request and the at least one additional power request from the hardware interface are activated and de-activated when both the power request and the at least one additional power request from the hardware interface are de-activated;
   wherein the hardware power controller is configured to power up the power domain in response to activation of the combined power request from the hardware interface.

14. The hardware system of claim 13 wherein:
   the at least one additional hardware block is configured to provide at least one additional power request from the at least one additional hardware block to thereby request that power to the at least one additional hardware block be maintained until the at least one additional power request from the at least one additional hardware block is de-activated; and
   the hardware system further comprises circuitry configured to combine the power request from the hardware block and the at least one additional power request from the at least one additional hardware block to provide a combined power request from the power domain that is activated when any one or more of the power request from the hardware block and the at least one additional power request from the at least one additional hardware block are activated and de-activated when both the power request from the hardware block and the at least one additional power request from the at least one additional hardware block are de-activated;
   wherein the hardware power controller is further configured to power down the power domain in response to de-activation of the combined power request from the hardware interface and de-activation of the combined power request from the power domain.

15. The hardware system of claim 1 wherein the power domain comprises the hardware block and at least one additional hardware block, and the hardware power controller is configured to power up the power domain in response to activation of any one or more of the power request from the hardware interface for the hardware block and at least one additional power request from the hardware interface for the at least one additional hardware block in the power domain.

16. The hardware system of claim 15 wherein:
   after the power to the power domain is activated, the at least one additional hardware block is configured to provide at least one additional power request to thereby request that power to the at least one additional hardware block be maintained until the at least one additional power request from the at least one additional hardware block is de-activated; and
   the hardware power controller is further configured to power down the power domain in response to de-activation of both the power request and the at least one additional power request from the hardware interface and de-activation of both the power request from the hardware block and the at least one additional power request from the at least one additional hardware block.

17. The hardware system of claim 1 wherein the hardware interface is a ring bus comprising a ring bus interface for each hardware block of a plurality of hardware blocks including the hardware block.

18. The hardware system of claim 1 wherein the hardware power controller is further configured to power down the power domain of the hardware block in response to a power down request from external software.

19. The hardware system of claim 1 wherein the hardware interface is further configured to request a clock for the power domain in response to receiving the at least one message for the hardware block.

20. A method of providing power control in a hardware system, the hardware system comprising a hardware block comprising one or more hardware components, a hardware power controller configured to control one or more power domains of the hardware system including a power domain of the hardware block, and a hardware interface, the method comprising:
   receiving, by the hardware interface, at least one message for the hardware block;
   storing, by the hardware interface, the at least one message;
   activating, by the hardware interface, in response to receiving the at least one message for the hardware block, a power request from the hardware interface to the hardware power controller;
   powering up the power domain of the hardware block, by the hardware power controller, in response to the activation of the power request from the hardware interface;
   in response to being powered on, activating, by the hardware block, in response to being powered up, a power request from the hardware block to the hardware power controller to thereby request that power to the hardware block be maintained until the power request from the hardware block is de-activated;
   receiving, by the hardware interface, an indication from the hardware block that the hardware block is ready to accept messages from the hardware interface; and
   providing, by the hardware interface, the at least one message to the hardware block in response to receiving the indication from the hardware block that the hardware block is ready to accept messages from the hardware interface.

21. The method of claim 20 further comprising de-activating, by the hardware interface, the power request from the hardware interface to the hardware power controller when there are no more messages received by the hardware interface that are to be provided to the hardware block.

22. The method of claim 21 further comprising:
   de-activating, by the hardware block, the power request from the hardware block to the hardware power controller when there are no more messages received from the hardware interface to be processed by the hardware block; and
   powering down the power domain of the hardware block, by the hardware power controller, in response to de-activation of the power request from the hardware interface and de-activation of the power request from the hardware block.

* * * * *